(12) United States Patent
Zhang et al.

(10) Patent No.: US 10,168,210 B2
(45) Date of Patent: Jan. 1, 2019

(54) SNAPSHOT-TYPE POLARIZED HYPERSPECTRAL CAMERA AND AN IMAGING METHOD

(71) Applicant: Institute of Remote Sensing and Digital Earth, Chinese Academy of Sciences, Beijing (CN)

(72) Inventors: Lifu Zhang, Beijing (CN); Hongming Zhang, Beijing (CN)

(73) Assignee: Institute of Remote Sensing and Digital Earth, Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/554,326

(22) PCT Filed: Sep. 25, 2015

(86) PCT No.: PCT/CN2015/090722
§ 371 (c)(1),
(2) Date: Aug. 29, 2017

(87) PCT Pub. No.: WO2017/004899
PCT Pub. Date: Jan. 12, 2017

(65) Prior Publication Data
US 2018/0120154 A1    May 3, 2018

(30) Foreign Application Priority Data
Jul. 6, 2015    (CN) .......................... 2015 1 0391920

(51) Int. Cl.
*G01J 3/02* (2006.01)
*G01J 3/447* (2006.01)

(52) U.S. Cl.
CPC .............. *G01J 3/0224* (2013.01); *G01J 3/02* (2013.01); *G01J 3/0278* (2013.01); *G01J 3/447* (2013.01)

(58) Field of Classification Search
CPC .... G01J 3/02; G01J 3/28; G01J 3/0224; G01J 3/0278; G01J 3/44; G01J 3/51; A61B 5/44; A61B 5/14; A61B 19/52; H01L 27/14
See application file for complete search history.

(56) References Cited

U.S. PATENT DOCUMENTS

| | | | |
|---|---|---|---|
| 2011/0206291 A1 | 8/2011 | Kashani et al. | |
| 2013/0063722 A1 | 3/2013 | Sparks | |
| 2013/0270421 A1* | 10/2013 | Kanamori | ............... G02B 23/24 250/208.1 |

FOREIGN PATENT DOCUMENTS

| | | |
|---|---|---|
| CN | 103063300 A | 4/2013 |
| CN | 103592029 A | 2/2014 |
| CN | 104568151 A | 4/2015 |

OTHER PUBLICATIONS

International Search Report and Written Opinion dated Mar. 25, 2016 received in International Application No. PCT/CN2015/090722.

* cited by examiner

*Primary Examiner* — Abdullahi Nur
(74) *Attorney, Agent, or Firm* — Stoel Rives LLP; Zhi-Xiang (Alex) Oh

(57) ABSTRACT

Disclosed are a snapshot-type polarized hyperspectral camera and an imaging method. The camera comprises polarizers (11), an image sensor (12), and a spectra filter (13). The spectra filter (13) is located on the image sensor (12). The polarizers (11) are located on one side of the image sensor (12). The method comprises: shielding and transmitting incident light by means of polarizers (11), so as to obtain light signals (101) with different polarizing angles; receiving, by means of an image sensor (12), the light signals with different polarizing angles, which are obtained by the polarizers (11), and converting the light signals with different (Continued)

polarizing angles into electric signals (102); and receiving, by means of a spectra filter (13), the electric signals converted by the image sensor (12), and filtering the electric signals, so as to obtain high-frequency electric signals (103) with a preset wavelength. By integrating a spectra filter (13) on a tiled pixel array of a sensor, a rapidly changing scene can be imaged; and meanwhile, by sticking a plurality of polarizers (11) into each channel with a specific wavelength, more exquisite imaging is realized.

10 Claims, 2 Drawing Sheets

SNAPSHOT-TYPE POLARIZED HYPERSPECTRAL CAMERA AND AN IMAGING METHOD

TECHNICAL FIELD

The present invention relates to the field of hyperspectral cameras, and specifically to a snapshot-type polarized hyperspectral camera and an imaging method.

BACKGROUND

Hyperspectral imaging technology is a narrowband-based image data technology that has been developed over the past two decades, which combines advanced technologies in the fields such as optics, optoelectronics, information processing and computer science, and is an emerging technology in which the conventional two-dimensional imaging technology and spectral technology are organically combined. The definition of hyperspectral imaging technology is to continuously image a target object in dozens or hundreds of spectral bands within the spectral range from ultraviolet to near-infrared by imaging spectrometers on the basis of multi-spectral imaging. While obtaining the spatial characteristics of the object, the spectral information of the measured object is also obtained.

Hyperspectral imaging technology has the characteristics of ultra multiband, high spectral resolution, narrow band, wide spectral range, and syncretic image-spectrum, etc. The advantages lie in abundant information of collected images, relatively high recognition and numerous data description models.

However, at present, it is very difficult for an ordinary imaging spectrometer to achieve imaging for a rapidly changing scene, and it is also not possible to capture very detailed spectral information from the imaging object.

SUMMARY

For the defects in the prior art that it is difficult to achieve imaging for a rapidly changing scene and it is not possible to capture very detailed spectral information from the imaging object, the present invention provides a snapshot-type polarized hyperspectral camera and an imaging method.

In the first aspect, the present invention provides a snapshot-type polarized hyperspectral camera, comprising polarizers, an image sensor, and a spectra filter, the spectra filter being located on the image sensor, and the polarizers being located on one side of the image sensor;

three polarizers are stuck into a first region, a second region and a third region of a channel with a preset wavelength at a first preset angle, a second preset angle and a third preset angle, respectively, the channel is divided into four regions, and the polarizers are used to shield and transmit incident light, so as to obtain light signals with different polarizing angles;

the image sensor is used to receive the light signals with different polarizing angles, which are obtained by the three polarizers, and convert the light signals with different polarizing angles into electric signals;

The spectra filter is used to receive the electric signals converted by the image sensor, and filter the electric signals, so as to obtain high-frequency electric signals with the preset wavelength.

Alternatively, the first preset angle is 0°, the second preset angle is 60°, and the third preset angle is 120°.

Alternatively, the polarizers are composite material obtained by laminating a polarizing film, an inner protective film, a pressure sensitive adhesive layer and an outer protective film.

Alternatively, the image sensor comprises photodiodes of $10^6$ orders of magnitude, each of the photodiodes is regarded as a pixel, and the image sensor is a pixel array composed of the pixels.

Alternatively, the spectral filter is integrated on the tiled pixel array.

Alternatively, the snapshot-type polarized hyperspectral camera further comprises a analog-to-digital converter, imaging lenses and a body;

the analog-to-digital converter is located in the body, for receiving the high-frequency electric signals obtained by the spectra filter and converting the analog signals of the high-frequency electric signals into digital signals;

the imaging lenses are located in the body, for receiving the digital signals obtained by the analog-to-digital converter and imaging the digital signals.

Alternatively, the image sensor is an area array CCD sensor.

In the second aspect, the present invention provides an imaging method based on the snapshot-type polarized hyperspectral camera, comprising:

shielding and transmitting incident light, by means of polarizers, so as to obtain light signals with different polarizing angles;

receiving, by means of an image sensor, the light signals with different polarizing angles, which are obtained by the polarizers, and converting the light signals with different polarizing angles into electric signals;

receiving, by means of a spectra filter, the electric signals converted by the image sensor, and filtering the electric signals, so as to obtain high-frequency electric signals with a preset wavelength.

Alternativley, three polarizers are respectively stuck into a first region, a second region and a third region of a channel with the preset wavelength at a first preset angle, a second preset angle and a third preset angle, respectively. The channel is divided into four regions. The first preset angle is 0°, the second preset angle is 60°, and the third preset angle is 120°.

Alternavively, the method further comprises:

receiving, by means of an analog-to-digital converter, the high-frequency electric signals obtained by the spectra filter, and converting the analog signals of the high-frequency electric signals into digital signals;

receiving, by means of imaging lenses, the digital signals obtained by the analog-to-digital converter, and imaging the digital signals.

It can be known from the technical solutions above that the present invention realizes imaging for a rapidly changing scene by integrating a spectra filter on a tiled pixel array of a sensor; and meanwhile, realizes more exquisite imaging by sticking a plurality of polarizers into each channel with a specific wavelength. The spectral features of the spectral fingerprint can be captured from an imaging object. These spectral features provide very detailed spectral information for the imaging object, remarkably improve the recognition and classification of the object, and have great significance for the key skill verification, medical diagnosis and security applications of the new generation of industry.

DETAILED DESCRIPTION

Detailed embodiments of the present invention are further described hereinafter with reference to the accompanying drawings. The following embodiments are merely used to more expressly illustrate the technical solutions of the present invention, and the protection scope of the present invention should not be limited thereto.

Figure 1:
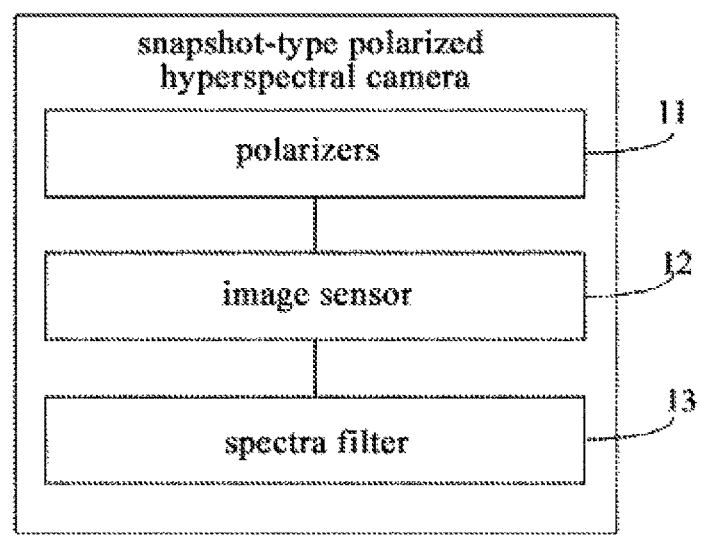
FIG. 1 is a structural schematic diagram of a snapshot type polarized hyperspectral camera provided by an embodiment of the present invention.

FIG. 1 illustrates a structural schematic diagram of a snapshot type polarized hyperspectral camera provided by an embodiment of the present invention, comprising polarizers 11, an image sensor 12 and a spectra filter 13, the spectra filter 13 being located on the image sensor 12, the polarizers 11 being located on one side of the image sensor 12.

Figure 2:
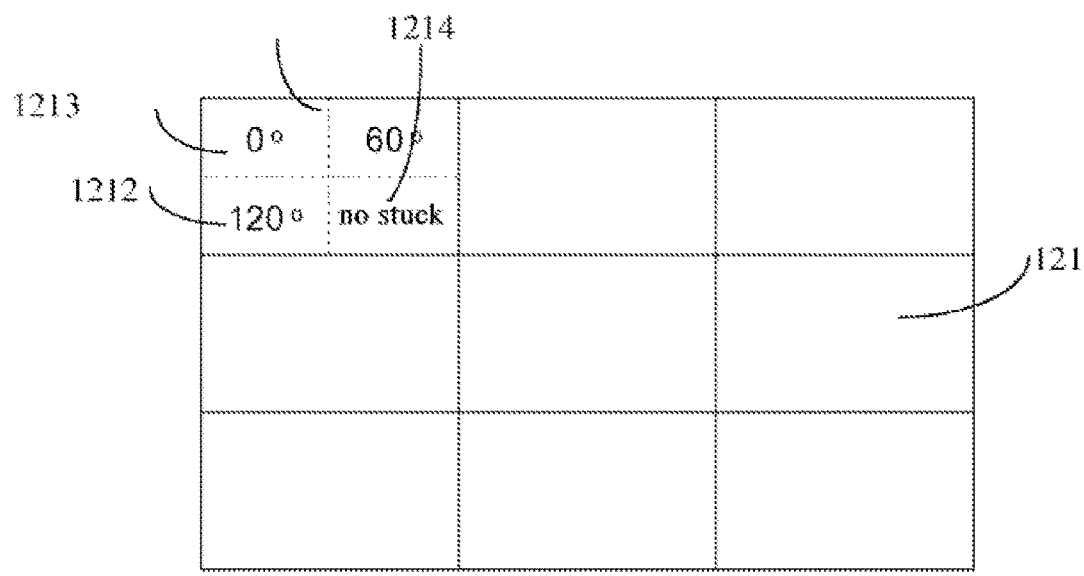
FIG. 2 is a schematic diagram of an image sensor of a snapshot type polarized hyperspectral camera provided by an embodiment of the present invention.

The image sensor 12 is used to receive the light signals with different polarizing angles, which are obtained by the polarizers, and converts the light signals with different polarizing angles into electric signals. The image sensor 12, which is the core component of the camera of the present invention, converts the diffusely reflected light signals of the collected sample into electric signals, and its quality determines the imaging quality of the hyperspectral camera. Although the volume of the image sensor 12 is very small, it contains hundreds of thousands or even tens of millions of diodes with sensitometric characteristics—photodiode. Each photodiode is a pixel, and the image sensor is a pixel array composed of the pixels. When there is a light irradiation, the photodiode will generate charge accumulation, and the accumulated charge will be eventually converted into the corresponding pixel data. A schematic diagram of the image sensor 12 is illustrated in FIG. 2. Each of the pixels corresponds to a channel 121, which is used to store selected contents and other information in an image file. The channel generally represents variations in the color gradation in the image, for example, the channel in a grayscale image representing variations in the 256 color gradations from black to white. In the present embodiment, each channel 121 is divided into four regions, that is, a first region 1211, a second area 1212, a third region 1213, and a fourth region 1214, respectively.

The spectra filter 13 is integrated on the tiled pixel array, for receiving the electric signals converted by the image sensor 12, and filtering the electric signals, so as to obtain high-frequency electric signals with a preset wavelength. The spectra filter 13 is integrated on the tiled pixel array of the image sensor 12, and may capture spectral features from an imaging object. These spectral features provide very detailed spectral information for the imaging object. In the present embodiment, it is mainly to capture high-frequency information of the spectra, so as to realize the purpose of snapshot. The snapshot-type imaging technology remarkably improves the recognition and classification of the object, and has great significance for the key enable technical verification, medical diagnosis and security applications of the new generation of industry.

The polarizers 11 are integrated on each of the channels 121 with the preset wavelength. In the present embodiment, three polarizers are integrated on each of the channels 121. The three polarizers are stuck into the first region 1211, the second region 1212 and the third region 1213 of the channel with the preset wavelength at a first preset angle 0°, a second preset angle 60° and a third preset angle 120°, respectively, to realize snapshot imaging from different angles for the imaging object. The polarizer is not stuck into the fourth region 1214. The polarizers are used to shield and transmit incident light such that one of the longitudinal light and transverse light is transmitted while the other is shielded, so as to obtain light signals with different polarizing angles. The polarizers 11 are composite material obtained by laminating a polarizing film, an inner protective film, a pressure sensitive adhesive layer and an outer protective film. More abundant spectral information of the imaging object can be obtained by disposing a plurality of polarizers 11 on each of the channels, thereby realizing more exquisite imaging.

The snapshot-type polarized hyperspectral camera provided by the present embodiment realizes imaging for a rapidly changing scene by integrating a spectra filter on a tiled pixel array of a sensor; and meanwhile, realizes more exquisite imaging by sticking a plurality of polarizers into each channel with a specific wavelength; besides, the snapshot-type hyperspectral imaging camera carries out hyperspectral imaging for a two-dimensional scene during each imaging, effectively alleviating the influence due to jitter and vibration of the platform; additionally, the camera is a method for capturing spectral information within an integral time of the detector array, which may avoid imaging artifacts, simplify the data processing process and improve the processing time.

The snapshot-type polarized hyperspectral camera described in the embodiment above further comprises a analog-to-digital converter (A/D converter), imaging lenses and a body; the analog-to-digital converter is located in the body, for receiving the high-frequency electric signals obtained by the spectra filter and converting the analog signals of the high-frequency electric signals into digital signals; and the imaging lenses are located in the body, for receiving the digital signals obtained by the analog-to-digital converter and imaging the digital signals. The analog-to-digital converter, imaging lenses and body described in the present embodiment are similar to conventional cameras. However, they are used in conjunction with polarizers, an image sensor and a spectra filter, which combines three optical detection technologies of imaging, spectroscopy and polarization, and thus more abundant spectral information of the imaging object can be obtained.

In the embodiment above, the image sensor may employ photodiodes of $10^6$ orders of magnitude; and the image sensor may employ an area array CCD sensor.

Figure 3:
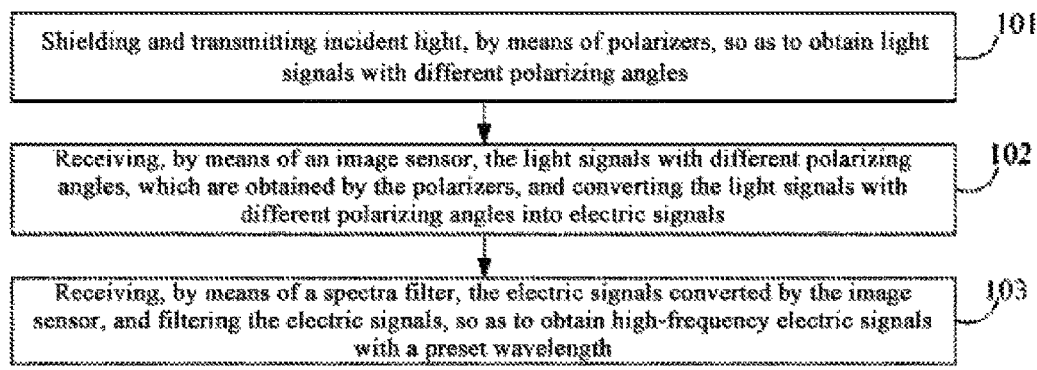
FIG. 3 is a flow schematic diagram of an imaging method for a snapshot-type polarized hyperspectral camera provided by an embodiment of the present invention.

FIG. 3 is a flow schematic diagram of an imaging method for a snapshot-type polarized hyperspectral camera provided by another embodiment of the present invention, comprising:

101. shielding and transmitting incident light, by means of polarizers 11, so as to obtain light signals with different polarizing angles;

102. receiving, by means of an image sensor 12, the light signals with different polarizing angles, which are obtained by the polarizers, and converting the light signals with different polarizing angles into electric signals;

103. receiving, by means of a spectra filter 13, the electric signals converted by the image sensor 12, and filtering the electric signals, so as to obtain high-frequency electric signals with a preset wavelength.

Wherein, three polarizers are stuck into a first region, a second region and a third region of a channel with the preset wavelength at a first preset angle, a second preset angle and a third preset angle, respectively. The channel is divided into four regions. The first preset angle is 0°, the second preset angle is 60°, and the third preset angle is 120°.

The imaging method for the snapshot-type polarized hyperspectral camera of the present invention realizes imaging for a rapidly changing scene by integrating a spectra filter on a tiled pixel array of a sensor; and meanwhile, realizes more exquisite imaging by sticking a plurality of polarizers into each channel with a specific wavelength.

In the embodiment above, the method further comprises:

receiving, by means of an analog-to-digital converter, the high-frequency electric signals obtained by the spectra filter, and converting the analog signals of the high-frequency electric signals into digital signals;

receiving, by means of imaging lenses, the digital signals obtained by the analog-to-digital converter, and imaging the digital signals.

Numerous specific details are illustrated in the description of the present invention. However, it can be understood that embodiments of the present invention may be practiced without these specific details. In some embodiments, the well-known methods, structures and techniques are not shown in detail, so as not to obscure the understanding of the description.

What is claimed is:

1. A snapshot-type polarized hyperspectral camera, characterized in that, it comprises polarizers, an image sensor and a spectra filter, the spectra filter being located on the image sensor, and the polarizers being located on one side of the image sensor;

three polarizers are stuck into a first region, a second region and a third region of a channel with a preset wavelength at a first preset angle, a second preset angle and a third preset angle, respectively, the channel is divided into four regions, and the polarizers are used to shield and transmit incident light, so as to obtain light signals with different polarizing angles;

the image sensor is used to receive the light signals with different polarizing angles, which are obtained by the three polarizers, and convert the light signals with different polarizing angles into electric signals;

the spectra filter is used to receive the electric signals converted by the image sensor, and filter the electric signals, so as to obtain high-frequency electric signals with the preset wavelength.

2. The snapshot-type polarized hyperspectral camera of claim 1, characterized in that, the first preset angle is 0°, the second preset angle is 60°, and the third preset angle is 120°.

3. The snapshot-type polarized hyperspectral camera of claim 1, characterized in that, the polarizers are composite material obtained by laminating a polarizing film, an inner protective film, a pressure sensitive adhesive layer and an outer protective film.

4. The snapshot-type polarized hyperspectral camera of claim 1, characterized in that, the image sensor comprises photodiodes of $10^6$ orders of magnitude, each of the photodiodes is regarded as a pixel, and the image sensor is a pixel array composed of the pixels.

5. The snapshot-type polarized hyperspectral camera of claim 4, characterized in that, the spectral filter is integrated on the tiled pixel array.

6. The snapshot-type polarized hyperspectral camera of claim 1, characterized in that, the snapshot-type polarized hyperspectral camera further comprises an analog-to-digital converter, imaging lenses and a body;

the analog-to-digital converter is located in the body, for receiving the high-frequency electric signals obtained by the spectra filter and converting the analog signals of the high-frequency electric signals into digital signals;

the imaging lenses are located in the body, for receiving the digital signals obtained by the analog-to-digital converter and imaging the digital signals.

7. The snapshot-type polarized hyperspectral camera of claim 1, characterized in that, the image sensor is an area array CCD sensor.

8. An imaging method based on a snapshot-type polarized hyperspectral camera, characterized in that, the method comprises:

shielding and transmitting incident light, by means of polarizers, so as to obtain light signals with different polarizing angles;

receiving, by means of an image sensor, the light signals with different polarizing angles, which are obtained by the polarizers, and converting the light signals with different polarizing angles into electric signals;

receiving, by means of a spectra filter, the electric signals converted by the image sensor, and filtering the electric signals, so as to obtain high-frequency electric signals with a preset wavelength.

9. The method of claim 8, characterized in that, three polarizers are stuck into a first region, a second region and a third region of a channel with the preset wavelength at a first preset angle, a second preset angle and a third preset angle, respectively, the channel is divided into four regions, the first preset angle is 0°, the second preset angle is 60°, and the third preset angle is 120°.

10. The method of claim 8, characterized in that, the method further comprises:

receiving, by means of an analog-to-digital converter, the high-frequency electric signals obtained by the spectra filter, and converting the analog signals of the high-frequency electric signals into digital signals;

receiving, by means of imaging lenses, the digital signals obtained by the analog-to-digital converter, and imaging the digital signals.

* * * * *